Feb. 6, 1951     T. C. GERNER     2,540,515
DRIVE SHAFT BUSHING ASSEMBLY
Filed Aug. 2, 1948     4 Sheets-Sheet 1
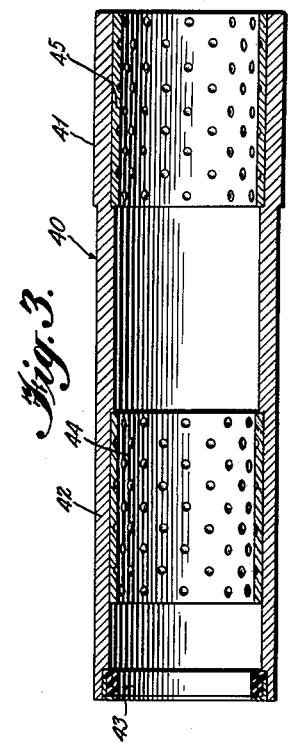
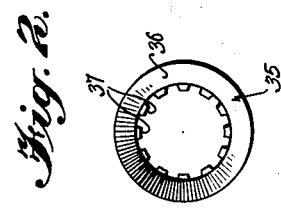
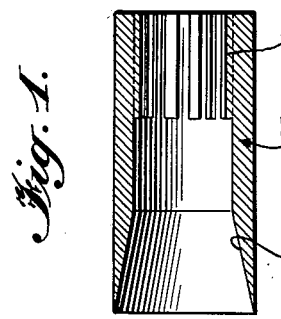
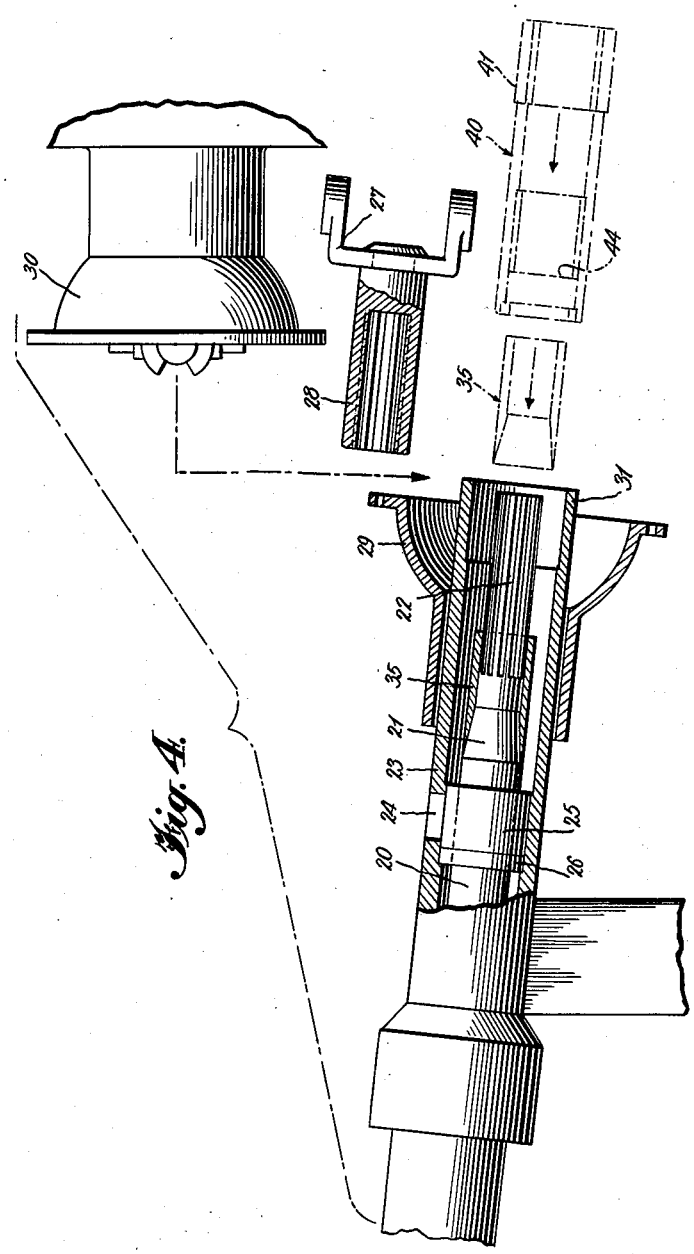
Inventor
*Theodore C. Gerner*
By *Stevens, Davis, Miller and Mosher*
Attorneys Feb. 6, 1951  T. C. GERNER  2,540,515
DRIVE SHAFT BUSHING ASSEMBLY
Filed Aug. 2, 1948  4 Sheets-Sheet 2

Inventor
Theodore C. Gerner
By Stevens, Davis, Miller and Mosher
Attorneys

Feb. 6, 1951 T. C. GERNER 2,540,515
DRIVE SHAFT BUSHING ASSEMBLY
Filed Aug. 2, 1948 4 Sheets-Sheet 3
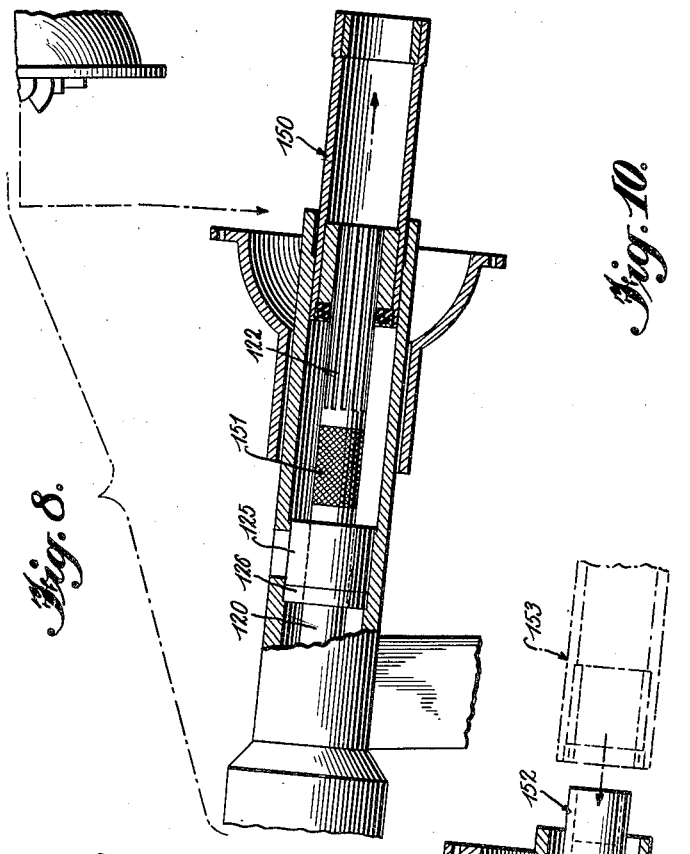
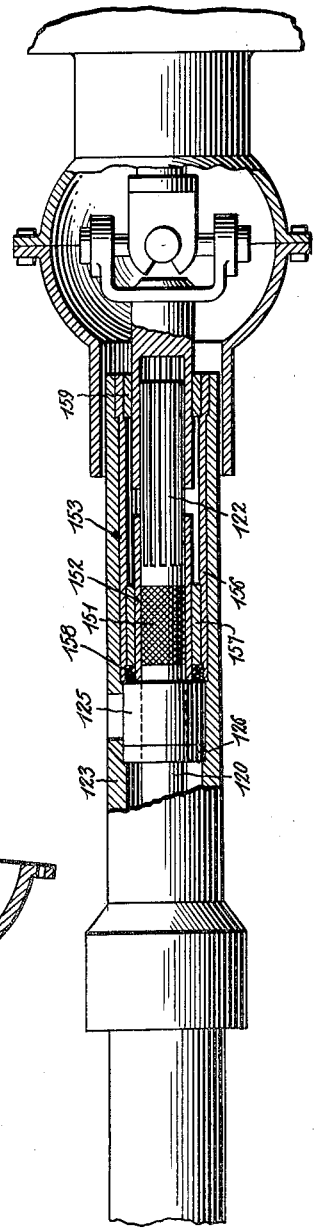
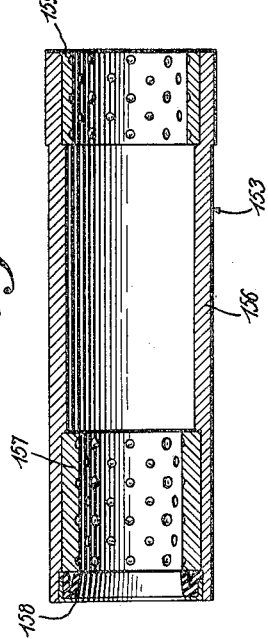
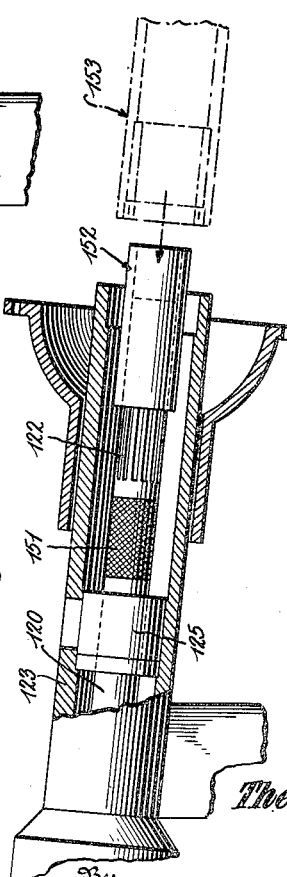
Inventor
Theodore C. Gerner
By
Stevens, Davis, Miller & Mosher
Attorneys Feb. 6, 1951 T. C. GERNER 2,540,515
DRIVE SHAFT BUSHING ASSEMBLY
Filed Aug. 2, 1948 4 Sheets-Sheet 4
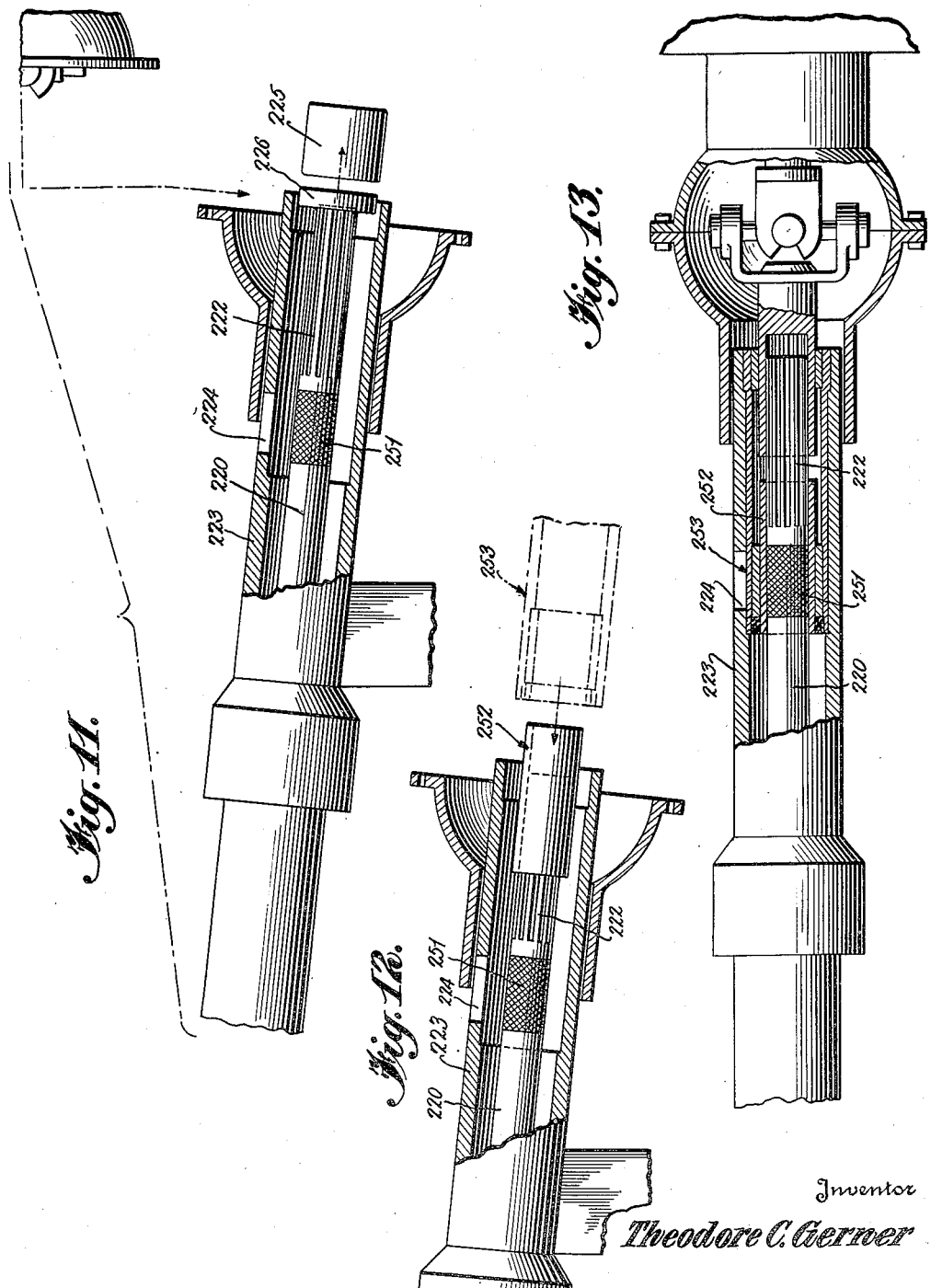
Inventor
Theodore C. Gerner
By Stevens, Davis, Miller & Mosher
Attorneys Patented Feb. 6, 1951

2,540,515

UNITED STATES PATENT OFFICE 2,540,515

DRIVE SHAFT BUSHING ASSEMBLY

Theodore C. Gerner, Oklahoma City, Okla.

Application August 2, 1948, Serial No. 42,018

10 Claims. (Cl. 308—36.1)

This invention relates to motor vehicle repairing and more particularly to a method and parts to be used in the repairing of a motor vehicle having an enclosed drive shaft, when the bearing that supports the drive shaft in the drive shaft housing just back of the universal joint, fails or becomes worn.

This invention is particularly applicable to the repair of motor vehicles manufactured by the Chevrolet Division of General Motors Corporation but can also be used in the repair of any other motor vehicle, manufactured by any other manufacturer, if that motor vehicle is so constructed as to be susceptible to repair by the method herein described or the use of the parts herein described.

For many years automobiles and trucks sold under the trade name "Chevrolet" have been so constructed that the rear wheels are driven from the transmission through a universal joint which in turn drives a drive or propeller shaft connected through the usual differential and rear axles to the rear wheels. In these motor vehicles the universal joint terminates at its rear end with an internally splined stub shaft and the drive or propeller shaft terminates at its forward end with an externally splined portion that fits into the internal splines of the stub shaft of the universal joint. The drive shaft is surrounded by a torque tube or propeller shaft or drive shaft housing extending from a point adjacent the universal joint to the differential housing at the rear of the automobile where it is rigidly fixed to that housing. At its forward end the drive shaft housing is received slidably in a bell housing that clamps onto the universal joint housing so that no rotating parts of the universal joint or drive shaft are exposed. As the rear wheels move vertically with respect to the chassis of the automobile, due to road shocks or loading, the drive shaft and the drive shaft housing slide into and out of the stub shaft and the bell housing to a slight extent.

Obviously, the forward end of the drive shaft will be supported to some extent by the stub shaft of the universal joint but this support is not sufficient for the forward end of the drive shaft and considerable whipping of the drive shaft would result if the drive shaft was not otherwise supported at its forward end. Therefore, for a long time past, Chevrolet automobiles and trucks, as originally manufactured, have contained a bearing located in the drive shaft housing and supported by this housing, for supporting in turn the forward end of the drive shaft at a point just to the rear of its splined portion.

Furthermore, oil from the transmission has been permitted to flow or be splashed back into the universal joint so as to lubricate the universal joint and a portion of this oil has been permitted to flow or be splashed still further back into the drive shaft housing to lubricate the drive shaft supporting bearing just described. In order to prevent this oil from flowing on back through the drive shaft housing, a sealing ring has been placed just to the rear of this drive shaft bearing and this sealing ring has been mounted in the drive shaft housing and arranged to press against the drive shaft so as to seal the drive shaft to the housing at that point and prevent the rearward flow of oil. Any such rearward flow of oil tends to drain oil from the transmission into the differential thus lowering the oil level in the transmission and unduly raising the oil level in the differential, which is undesirable.

The above construction is satisfactory until such a time as the drive shaft supporting bearing becomes worn or the sealing ring begins to leak oil. At such a time, it becomes necessary to replace the defective part and usually at the same time, it will be found that the drive shaft itself has become worn and scored at the place where it passes through the bearing and seal, and hence it has heretofore been necessary also to replace the drive shaft.

The bell housing which surrounds the forward end of the drive shaft housing may be disconnected from the rear end of the transmission housing to which it is bolted and it will then slide rearwardly on the outside of the drive shaft housing so that access may be had to the universal joint. The universal joint may then be separated and this will permit the forward end of the drive shaft housing, the bell housing, the drive shaft and the rear fork and stub shaft of the universal joint to be lowered. The rear fork and stub shaft of the universal joint may then be slipped forward off of the splines of the drive shaft and the drive shaft bearing may be driven out of the drive shaft housing by inserting a drift or similar tool through an opening that is generally provided in the drive shaft housing at the point where the bearing is mounted therein. The seal can generally be removed in the same way and a new bearing and seal can be inserted in the place of the old bearing and seal.

This effects a satisfactory repair if the drive shaft itself is not so worn or scored that it will soon destroy the new bearing and perhaps also the new seal. This latter condition exists so frequently, however, that it is generally necessary at the same time to replace the drive shaft. This can be done only by disassembling the differential at the rear end of the car, for the drive shaft cannot be removed through the front end of the drive shaft housing.

Experienced mechanics find that a very considerable amount of time is required to disassemble the differential and remove the drive shaft from the rear end of its housing and they find furthermore that when the differential is disassembled and reassembled, it is almost impossible to procure a sufficiently accurate alignment of parts so that the differential will operate quietly. It therefore becomes necessary, in many, if not most instances, to replace a good many of the parts in the differential at the time this operation is performed, even though these parts would operate satisfactorily for a long additional period if they had not been disturbed. The result is that the repairs necessary when the drive shaft supporting bearing becomes worn or its seal begins to leak, are generally very extensive and very costly. It is the object of the present invention to provide a method and the parts for effecting this repair more expediently, more cheaply, and at least as satisfactorily.

In United States Letters Patent No. 2,403,520, granted to this inventor on July 9, 1946, there was disclosed a method and a part for effecting this repair without the removal of the drive shaft from the drive shaft housing and without even the removal of the old bearing and seal. This patent has since been held valid by the District Court for the Western District of Oklahoma.

In this patent the repair was effected by disconnecting the housing and the universal joint, at the universal joint, and by the simple insertion of a repair unit in the forward end of the drive shaft housing and the reassembling of the universal joint and housing. The method and part of this patent have proven commercially practicable on a large scale.

The present invention is directed to an improved method and parts that are usable with the somewhat different original constructions of the motor vehicle that occur in some models and are also usable after the method of the aforementioned patent has been once used and the bearings have again become worn.

In order to use the method and part of the aforementioned patent, it is necessary that there be, in the original construction, an appreciable distance between the rear end of the splines on the drive shaft and the forward end of the journal for the original bearing. It is also necessary that the drive shaft throughout this distance be of uniform diameter and have a smooth, unworn surface.

In some constructions of motor vehicles of the Chevrolet type, the drive shaft is formed with a taper almost immediately to the rear of the splines and the drive shaft is larger from this taper toward the rear. In such constructions, it will immediately be apparent that there will be an insufficient amount of smooth, uniform diameter surface to receive the drive shaft bearing of the device of the aforementioned patent.

Even in motor vehicles in which the drive shaft is of uniform diameter for a sufficient distance immediately behind the splines, and in which the repair part of Patent 2,403,520 can be used for the first repair, the bearing of this repair part will eventually wear and the portion of the drive shaft under that bearing will eventually wear, and thereafter it will not be feasible to again repair the bearing with the type of repair part shown in the aforesaid patent because the wear on the drive shaft will not give the second replacement bearing a satisfactory surface against which to operate.

In still other constructions, particularly those occurring in Chevrolet automobiles made in 1937 or before, there is not a sufficient distance between the original bearing and the splined part of the drive shaft to provide a surface for the bearing of the repair part of the aforementioned patent. In all of these instances a mechanic is faced with the necessity of disassembling the differential and removing the drive shaft of the rear end of the drive shaft housing and thus performing a major repair job.

The purpose of the present invention is to provide a method and the necessary parts for the effecting of repairs in the above-mentioned instances, in an efficient, relatively inexpensive manner that will properly effect the repair and give the motor vehicle at least as satisfactory a drive shaft bearing as it originally had.

Briefly, the method of the present invention consists in disconnecting the drive shaft and its attendant parts at the universal joint, removing the rear fork and stub shaft of the universal joint, removing the stub shaft bearing at the forward end of the propeller shaft housing, if there is one, removing the old drive shaft bearing and seal, if necessary, inserting a thin sleeve over the drive shaft, inserting a new bearing and seal over this sleeve, replacing the stub shaft and rear fork of the universal joint and reassembling the universal joint and the drive shaft housing.

The key part in this new method is a thin sleeve which fits over the drive shaft. This part is preferably formed with internal splines at one end so that it will not only fit snugly over the end of the drive shaft but will also be keyed to the drive shaft and will turn therewith. This sleeve is adapted to slide far enough to the rear on the drive shaft so that it will not interfere with the stub shaft of the universal joint in its movement upon the splines of the drive shaft. It is formed internally to fit the particular type of drive shaft with which it is to be used. Thus, in the case of a drive shaft which has a taper adjacent the spline, the sleeve is tapered to fit over this taper and present a smooth, uniform diameter, external surface adapted to receive the necessary bearing. When replacing a unit of the type shown in United States Patent No. 2,403,520, the sleeve still contains the internal splines which lock it to the drive shaft but its internal diameter, except for the splines, may be uniform so that it will fit over the uniform diameter shaft at the place where the bearing of the first replacement unit originally fitted. The external face of this sleeve then provides a new bearing surface at that point. In cases where the distance between the rear end of the splines and the forward end of the old, original bearing are too close together to permit the use of the repair part of United States Patent No. 2,403,520, the old bearing and seal may be removed and a sleeve of a uniform internal diameter, except for the internal splines at one end, may be placed over the shaft thus covering the worn portion of the shaft, which was worn by the original bearing and seal, and a new bearing may then be placed in the propeller shaft housing around this sleeve and bearing upon this sleeve.

Usually the sleeve will be made as thin as practicable and will have a full complement of internal splines, extending throughout a part, ordinarily about a fifth, of its length. Normally, it will be made of steel, or some other hard wear resistant metal and have a ground or finely machined outer surface of uniform diameter. Part or even all of the splines can be omitted but it has been found definitely preferable not to omit all of the splines because slippage may occur if this is done.

The construction of the repair bearing and seal of this invention is generally similar to that shown in United States Patent No. 2,403,520, except for dimensions, and the details will be apparent, as will other details of this invention and other advantages of this invention, from a consideration of the drawings and the following detailed description thereof. In these drawings are illustrated three typical embodiments of the method and repair parts of this invention.

Figure 1 is a cross-sectional view of a sleeve manufactured in accordance with this invention for use with a tapered type of drive shaft.

Figure 2 is an end view of this same sleeve.

Figure 3 is a cross-sectional view of a bearing and seal unit for use along with the sleeve of Figures 1 and 2 for the repair of an automotive vehicle having a tapered drive shaft.

Figure 4 is a view partly in cross-section of the parts of an automobile involved in this invention and this view is arranged to illustrate the method of repairing an automobile, having a tapered drive shaft, in accordance with the principles of this invention.

Figure 7 is a view in cross-section of a bearing and seal unit for use in repairing a vehicle which has a drive shaft of uniform diameter but which has already once been repaired by the use of the repair part of the United States Patent No. 2,403,520 and which now requires further repair.

Figure 8 is a view partly in section of the parts of an automobile involved in the repair mentioned in connection with Figure 7, this view showing the removal of the old repair parts which are now worn.

Figure 9 is a similar view to that of Figure 8 but showing the manner of insertion of the new sleeve and new bearing unit.

Figure 10 is a similar view of the parts shown in Figures 8 and 9 but showing these parts in the completely reassembled condition.

Figure 11 is a view partly in section of the parts of an automotive vehicle involved in this repair, the vehicle shown in this figure being one of the type in which the original bearing and seal were too close to the splines on the drive shaft to permit repair in accordance with the United States Patent No. 2,403,520, this view showing the operation of removing the old bearing and seal.

Figure 12 is a view similar to Figure 11, showing the operation of inserting the new sleeve and new bushings.

Figure 13 is a view similar to Figures 11 and 12, showing the automotive vehicle completely reassembled with a new sleeve and bearing in place.

Figures 5, 6:
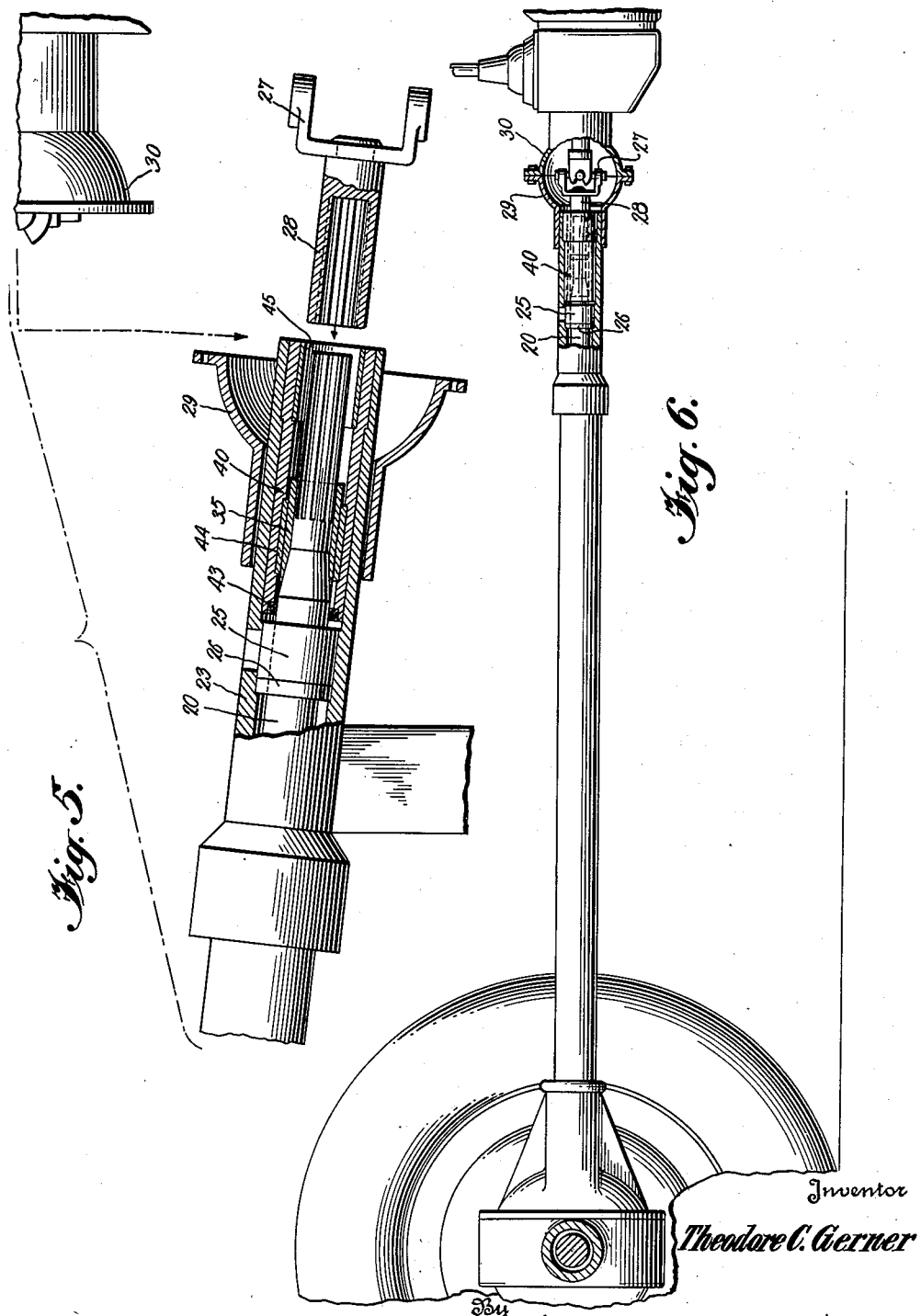
Figure 5 is a view similar to that of Figure 4, showing the same automobile after the sleeve, and bearing and seal unit of this invention have been inserted but before the drive shaft and universal joint have been reassembled.
Figure 6 is a generally similar view, also partly in section, showing somewhat more of the automotive vehicle and showing the vehicle in its completely reassembled state.

As illustrated in Figures 1 to 6, inclusive, some automotive vehicles are constructed with a drive shaft 20 which is tapered at a point 21 just to the rear of the splines 22 which are at the forward end of the drive shaft. In such constructions the drive shaft is customarily surrounded by a drive shaft housing 23 which extends from the front end of the drive shaft to the differential to which it is rigidly bolted. The drive shaft housing is generally made in two parts and there is generally a slot 24 cut over the original drive shaft bearing 25 so that that bearing can be driven out the forward end of the drive shaft housing 23 if necessary. Generally, there is an oil seal 26 located just behind the drive shaft bearing 25 to prevent oil from passing down the drive shaft housing to the differential.

The rear part of the universal joint, in such constructions is usually a fork 27 to which is attached a stub shaft 28 which is internally splined. This stub shaft slides over the splined end of the drive shaft when the car is fully assembled. The fork 27 is then connected to the complementary fork of the universal joint by a pin or cross-member. A bell housing 29 is slidably mounted on the outside of the drive shaft housing 23 and this, when the car is assembled, is bolted to the rear end of the transmission housing 30 of the automotive vehicle.

As has been explained, when the original bearing 25 and perhaps also the oil seal 26 become worn, they can be removed by driving them out the forward end of the drive shaft housing by means of a drift or other tool inserted in the slot 24 in the drive shaft housing. However, since the drive shaft is usually worn or scored under the drive shaft bearing 25, this surface is generally not satisfactory for the reception of a new bearing and hence repair by mere replacement of the bearing 25 is generally not satisfactory and is necessary to perform a major disassembly to replace the drive shaft.

According to the present invention, the repair is effected by unbolting the bell housing 29 from the transmission housing 30, sliding it rearwardly on the drive shaft housing 23, unfastening the universal joint and sliding the rear fork 27 and its sub-shaft 28 slightly to the rear on the splines 22 of the drive shaft 20. The drive shaft and its attendant parts are then lowered without disassembling the rear end of the automobile and the stub shaft 28 can be moved forward off of the drive shaft.

In some models there is a bearing positioned in the extreme front end of the drive shaft housing 23 at the position indicated as 31. In those models, this bearing can be removed by using a hook-shaped tool so that it will not interfere with the making of the instant repair.

The next operation consists in the insertion of a sleeve 35, such as is illustrated in Figures 1 and 2. This sleeve 35 is tapered at 36 to fit over the taper 31 on the drive shaft, and is provided with internal splines 37 extending about one-fourth of its length, which splines fit into the splines 22 of the drive shaft. This sleeve 35 is of such dimensions that it fits tightly on the drive shaft and does not cover enough of the splines of the drive shaft to interfere with the longitudinal movement of the stub shaft 28 thereon when the vehicle is reassembled. In placing it on the drive shaft, it will be started on the drive shaft by hand and then forced into place by driving it, usually with the aid of a tube of slightly larger diameter than the external diameter of the splines.

After the sleeve 35 is in place, a repair unit such as is shown in Figure 3 may be inserted into the drive shaft housing 23 around the drive shaft 20 and the sleeve 35. This repair unit 40 will ordinarily be so dimensioned that it will make a drive fit with the housing and will therefore be held tightly in position once it is driven into the housing around the drive shaft and sleeve.

As illustrated in Figure 3, the external diameter of the repair unit 40, which is cylindrical, is uniform except for a small enlarged portion at one end 41 which is adapted to fit in the slightly enlarged portion 31 of the drive shaft housing 23 where the original bearing for the stub shaft 28 was placed. In those constructions in which there was no bearing for the stub shaft 28, the internal diameter of the drive shaft housing 23 will not be enlarged at the forward end and, of course, the repair unit will not have the enlarged end to fit that enlarged portion of the drive shaft housing.

The repair unit illustrated in Figure 3 consists of an outside housing 42 which extends the full length of the unit and in which are mounted a sealing ring 43 adjacent what will be the rear end of this bearing when it is placed in the automotive vehicle, a drive shaft bearing 44 which is placed at such a position in the housing that it will be journalled upon the sleeve 35 when the unit is in place, and a stub shaft bearing 45 which is placed adjacent the front end of the housing 42. When there is no bearing provided for the stub shaft in the original installation, the corresponding bearing 45 may be eliminated from the repair unit.

As can be seen in Figure 3, appropriate shoulders are provided internally of the housing 42 so as to position the sealing ring and the two bearing elements mounted therein and to cause these elements to maintain their respective positions. Of course, these elements are pressed into the housing and fit tightly therein so that there is little tendency for them to move in any event.

Figure 4 shows the pertinent parts of a motor vehicle after the bell housing 29 has been unbolted from the transmission case 30 and moved backward on the drive shaft housing 23 and after the rear fork of the universal joint has been disconnected from the universal joint, the whole drive shaft assembly dropped a short distance and the stub shaft and the universal fork removed. As illustrated in Figure 4, the tapered sleeve 35 has been placed on the drive shaft and driven into its final position. Figure 4 also shows in dotted lines a sleeve 25, with an arrow indicating the direction in which it is inserted and placed on the drive shaft 20. This figure further shows the repair unit 40 about to be placed in the final assembly and with an arrow indicating the direction in which it is moved into its final position in the assembly.

Figure 5 illustrates the method of repairing an automobile according to what has already been described above and shows the repair unit 40 as well as the sleeve 35 in position in the drive shaft housing 23. This figure also shows the stub shaft and universal fork about to be placed into position in the assembly. Figure 6 shows the assembly completed and the motor vehicle ready for operation.

Figures 7, 8, 9 and 10 illustrate the embodiment of this invention in which a repair unit of the type described in United States Letters Patent No. 2,403,520 has been used and has become worn to a point where further repair is necessary. As illustrated in Figure 8, the drive shaft 120 is of uniform diameter and has no tapered portion. When the first repair became necessary, the original bearing 125, and perhaps also the original seal 126 were worn and perhaps the drive shaft 120 was also worn or scored under this bearing and seal. There was, however, a sufficient distance between the original bearing 125 and the splines 122 on the original drive shaft so that a unit of the type described in the above-mentioned patent could be used. Such a device 150 is shown in Figure 8 as partly removed and there is indicated at 151 on the drive shaft 120 the portion of that drive shaft that was worn by the drive shaft bearing in the now worn repair part 150.

In accordance with this embodiment of the present invention, after having removed the worn repair part 150 as illustrated in Figure 8, the worn portion 151 of the drive shaft 120 is next covered by a sleeve 152 that is shown in Figure 9 as being inserted in the propeller shaft housing 123 over the end of the drive shaft 120. As can be seen from Figure 9, the sleeve 152 is a relatively thin, cylindrical sleeve and when inserted this sleeve will cover the worn section 151 of the drive shaft and a small portion of the splines 122 of the drive shaft. This sleeve 152 has a smooth, usually hardened outer surface, and has internal splines adacent one end, which splines mesh with the external splines 122 on the drive shaft 120.

After the sleeve 152 has been pressed into place as was the sleeve in the previous embodiment shown in Figures 1 to 6, inclusive, a repair unit 153 is pressed into place around the sleeve and drive shaft, and inside of the drive shaft housing 123. This repair unit is illustrated in detail in Figure 7 and consists of a tubular housing 156 which is of uniform diameter except for a small enlarged section at one end that fits into the enlarged diameter section at the end of the propeller shaft housing 123, as previously explained. Inside of the housing 156 is positioned a drive shaft bearing 157 and a sealing ring 158, both adjacent the rear end of the housing. At the front end of this housing may be placed a bearing 159 adapted to receive the stub shaft of the universal joint, or this may be omitted if it was not present in the original construction.

Figure 10 shows the completed repair and the motor vehicle again in condition for operation.

Figures 11, 12 and 13 illustrate a third embodiment of this invention and specifically show the application of the principles of this invention to a construction such as is encountered in Chevrolet automobiles manufactured before 1937, and in which there was an insufficient distance between the original drive shaft bearing and the splines to provide a bearing surface for an additional bearing. As illustrated in Figure 11, the drive shaft 220, like the drive shaft 120 in Figure 9, is of uniform diameter. The splines 222, however, extend rearwardly to a point so close to the original bearing and seal that no room is left for additional bearing surface. For that reason, in order to repair this type of construction, it is necessary to insert a drift or other tool through the slot 224 in the propeller shaft housing 223 and drive the original bearing 225 and the original seal 226 out of the end of the propeller shaft housing. In Figure 11, the original bearing and the original seal are shown as being removed from the housing and the worn part of the drive shaft 220 is indicated as 251.

After the original bearing and seal have been removed, in order to repair this construction, a sleeve 252, which is quite similar to the sleeve 152 of Figure 9 is pressed into place on the drive shaft to cover the worn portion of the drive shaft 251. A repair unit 253 is next pressed into the propeller shaft housing 223 in exactly the manner in which the bushing 153 was placed in the propeller shaft housing 123. The completed repair is shown in Figure 13.

Numerous minor variations in the application of the principles of this invention will be apparent to those skilled in the art and are within the scope of this invention. For example, the sealing ring 43, as shown in Figure 5, may be moved toward the front end of the drive shaft a sufficient distance so that it will rest on the sleeve 35 instead of resting on the propeller shaft 20. There is some advantage, however, to having it rest on the propeller shaft 20 because when it does rest on the propeller shaft 20, it will prevent any leakage of oil that may occur between the sleeve 35 and the propeller shaft from passing on to the differential. However, such leakage is generally small and can be ignored in most instances. Again, as illustrated in Figure 10, the sealing ring 158 bears on the sleeve 152. If desired, the sleeve 152 may be shortened slightly so that it will not extend under the sealing ring 158 which will then bear directly upon the drive shaft 120, for the same purpose. The same change in construction can be made in the construction illustrated in Figure 13.

The principles of this invention may be applied to a construction such as is illustrated in this applicant's application 24,004, filed April 29, 1948, after the original repair bushing and the shaft under it have become worn. To do this, the original repair part of that application is removed, the worn portion of the shaft covered by a sleeve such as has been previously described, and a new repair part similar to that illustrated in the above application, but of larger internal diameter, is installed.

I claim:

1. In an automotive vehicle, a drive shaft housing, a drive shaft in said housing having external splines at its forward end, a thin sleeve covering the drive shaft from a point forward of the rear end of said splines to a point rearward of the rear end of said splines, said sleeve having inwardly extending splines meshing with the splines in said drive shaft, and a bearing mounted in said housing and cooperating with the external surface of said sleeve to support said drive shaft for rotation within said housing.

2. In an automobile vehicle, a drive shaft housing, a drive shaft in said housing having external splines at its forward end and tapering to a larger diameter immediately to the rear of said splines, a thin sleeve covering the drive shaft from a point forward of the rear end of said splines to a point rearward of the beginning of said taper, said sleeve having inwardly extending splines meshing with the splines on said drive shaft and being tapered on the inside to fit over the taper on the drive shaft, and a bearing mounted in said housing and cooperating with the external surface of said sleeve to support the drive shaft for rotation in said housing.

3. In an automobile vehicle, a drive shaft housing, a drive shaft in said housing having external splines at its forward end, a worn bearing in said housing that originally supported a drive shaft for rotation within said housing near its forward end, said bearing being positioned some distance to the rear of the rear end of said splines, a thin sleeve covering the drive shaft from a point forward of the rear end of said splines to a point rearward of the rear end of said splines but forward of the forward end of said worn bearing, said sleeve having inwardly extending splines meshing with the splines in said drive shaft, and a bearing mounted in said housing and cooperating with the external surface of said sleeve to support the drive shaft for rotation within said housing.

4. A repair part of an automotive vehicle of the enclosed drive shaft type that includes a drive shaft, a housing therefor, and a bearing for the forward end of said drive shaft held in fixed axial position in said housing, said repair part comprising a thin cylindrical sleeve the inner surface of which is dimensioned to fit tightly over the outer surface of the drive shaft and the outer surface of which is smooth finished to form a bearing surface, and splines on the inner surface of said sleeve extending throughout a part of the length of said sleeve and dimensioned to fit into external splines on the drive shaft.

5. A repair part for an automobile of the enclosed drive shaft type that includes a drive shaft carrying splines at its forward end and tapered to a larger diameter immediately to the rear of the splines, a housing therefor, and a bearing for the forward end of said drive shaft positioned to the rear of said taper, said bearing being held in fixed axial relation in the housing, said repair part comprising a cylindrical sleeve the outer surface of which is smooth finished to form a bearing surface the inner surface of which is tapered and dimensioned to fit over the tapered portion of the drive shaft and the rear end of the splined portion of the drive shaft and internal splines in said sleeve dimensioned to fit into the external splines of said drive shaft and extending throughout a part only of the length of the sleeve.

6. A combination of repair parts for an automobile of the enclosed drive shaft type that includes a drive shaft, a housing therefor, and a bearing for the forward end of said drive shaft held in fixed axial position in said housing, the combination of repair parts comprising a thin, cylindrical sleeve the outer surface of which is smooth finished to form a bearing surface and the inner surface of which is dimensioned to fit over the forward end of the drive shaft, said sleeve including inwardly extending splines adapted to engage external splines on the drive shaft and said splines extending throughout only a portion of the length of said sleeve, and a bushing unit externally shaped to fit into the forward end of the drive shaft housing and internally shaped to provide a bearing that will cooperate with the external surface of the sleeve to form a new bearing and a sealing ring that will prevent rearward flow of oil through the drive shaft housing.

7. A combination of repair parts for an automobile of the enclosed drive shaft type that includes a drive shaft, a housing therefor, and a bearing for the forward end of said drive shaft held in fixed axial position in said housing, the combination of repair parts comprising a cylindrical sleeve the outer surface of which is smooth finished to form a bearing surface and the inner surface of which is dimensioned to fit over the forward end of the drive shaft, said inner surface carrying inwardly extending splines throughout a part of its length which splines are adapted to fit into externally extending splines on the drive shaft, and a bushing unit dimensioned to fit tightly into the drive shaft housing and including a bearing adapted to cooperate with the outer surface of said sleeve to form a new bearing for the forward end of the drive shaft.

8. A combination of repair parts as defined in claim 7 further characterized in that the bushing unit includes a sealing ring adapted to cooperate with the drive shaft to seal the drive shaft to the bushing unit and prevent the flow of oil therethrough.

9. A combination of repair parts as defined in claim 8 further characterized in that the sealing ring is positioned to the rear of the bearing in the bushing unit as the device is installed in the automobile.

10. A kit of repair parts as defined in claim 9 further characterized in that the bushing unit includes a sleeve adapted to fit tightly in the drive shaft housing and position the parts therein axially with respect to the housing.

THEODORE C. GERNER.

REFERENCES CITED

The following references are of record in the file of this patent:

UNITED STATES PATENTS

| Number | Name | Date |
| --- | --- | --- |
| 1,043,603 | Jones | Nov. 5, 1912 |
| 1,354,259 | Lusk | Sept. 28, 1920 |
| 1,374,624 | Zumwalt | Apr. 12, 1921 |
| 1,992,815 | Craney | Feb. 26, 1935 |
| 2,197,883 | Sinclair | Apr. 23, 1940 |
| 2,403,520 | Gerner | July 9, 1946 |
| 2,405,541 | Gerner | Aug. 6, 1946 |